United States Patent Office 2,968,198
Patented Jan. 17, 1961

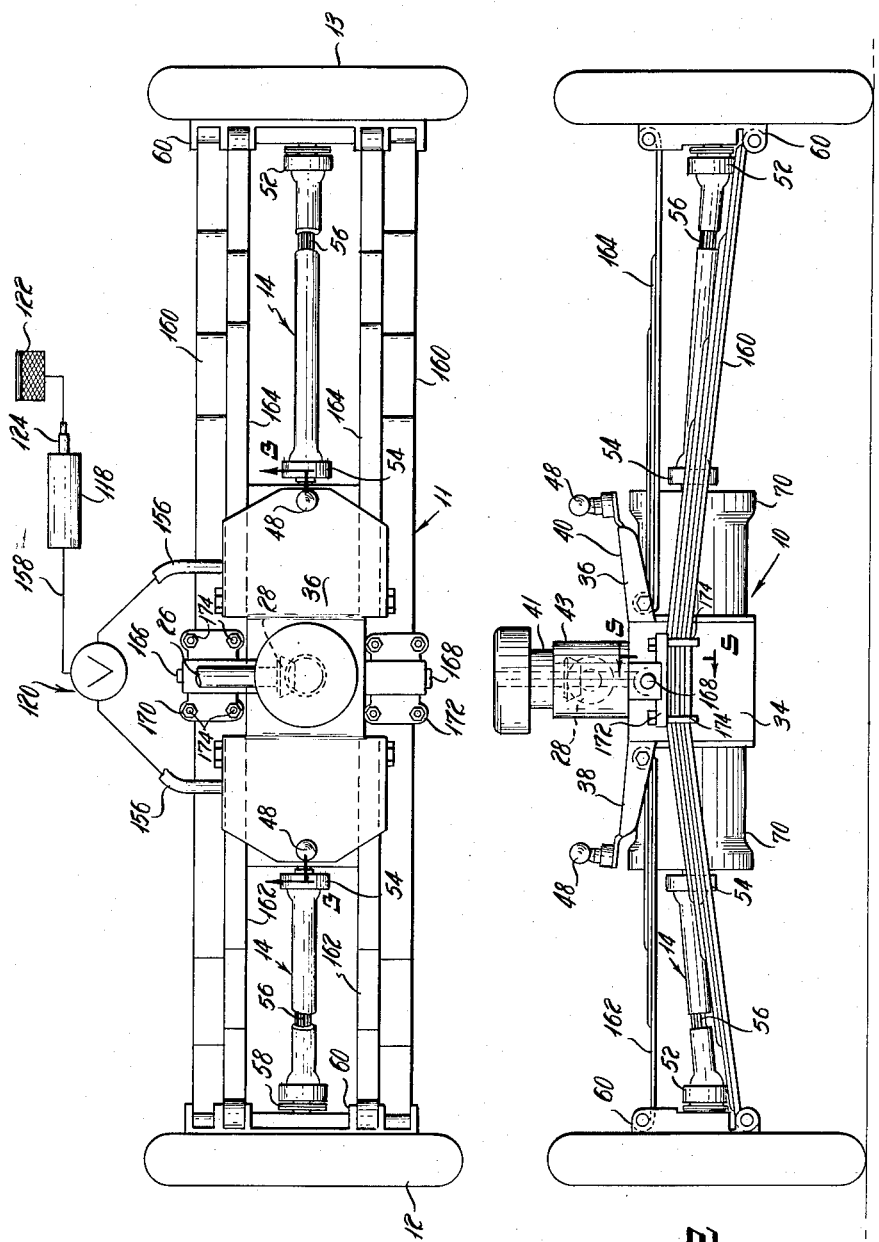

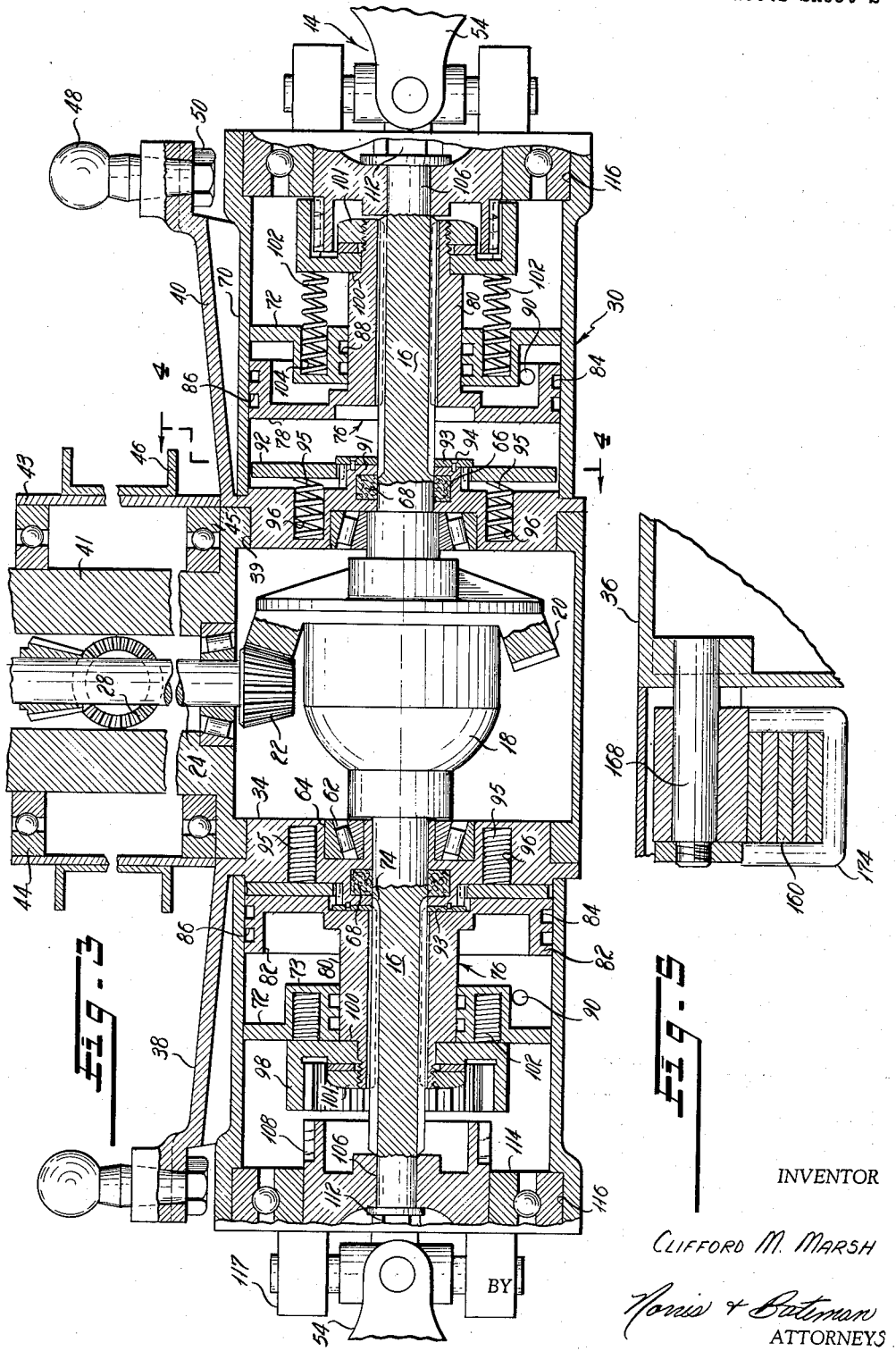

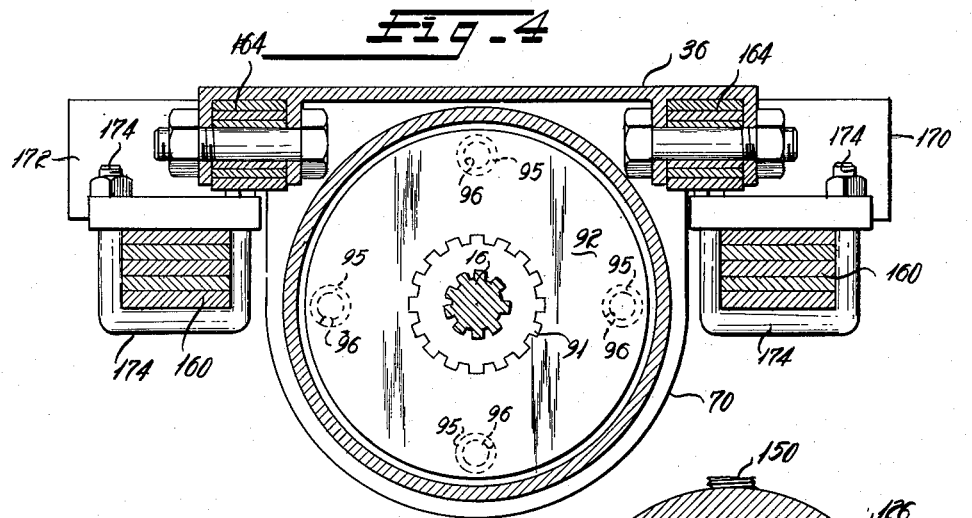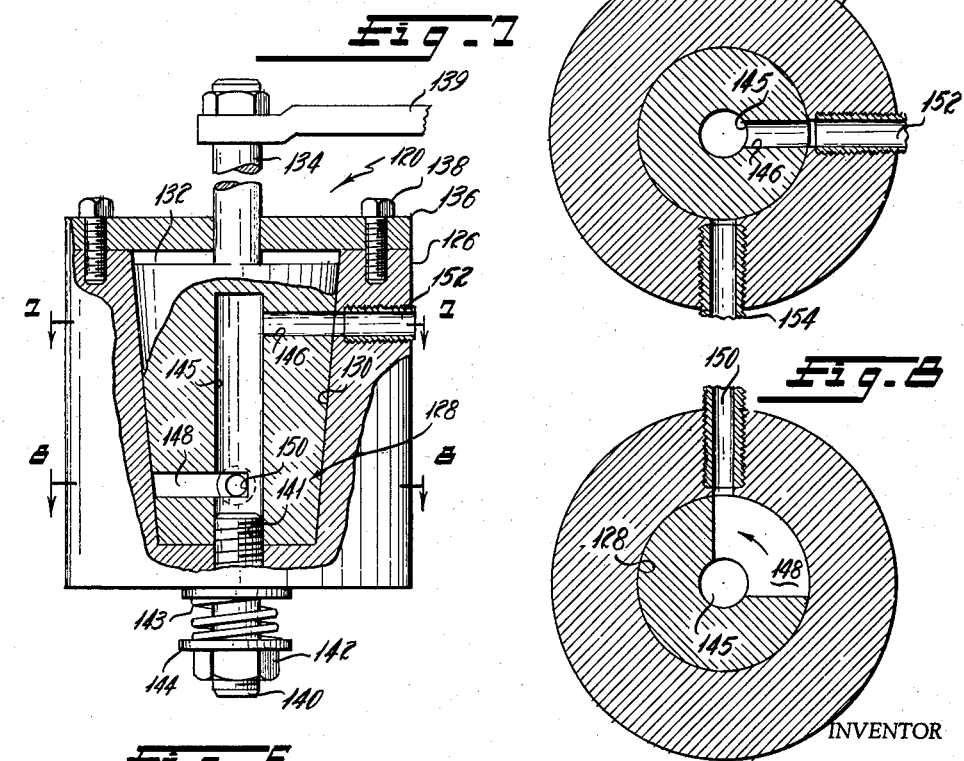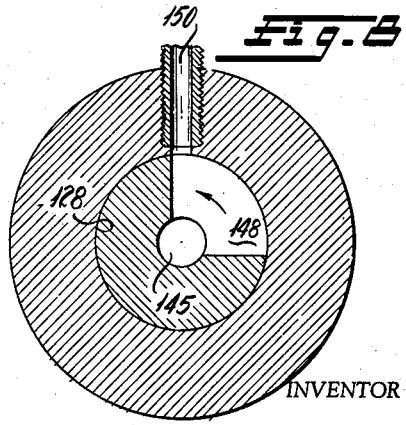

2,968,198

FRONT WHEEL DRIVE AND STEERING UNIT

Clifford M. Marsh, 15 Loockerman Ave.,
Poughkeepsie, N.Y.

Filed June 26, 1958, Ser. No. 744,738

12 Claims. (Cl. 74—710.5)

This invention relates to a steering drive axle assembly and more particularly is concerned with a clutch and brake control system for a vehicle by which steering is effectively aided in the releasable application and control of torque to separate ground-engaging wheels.

In the modern work type vehicle commonly assuming the form of a tractor, whether it be of the track laying or the non-dirigible wheel type, there is found a basic work tool for many diverse industries and operations. These vehicles are employed over a variety of terrains where they are subjected to an assorted number of rugged and adverse ground conditions in carrying out the operations for which they are suited. Handling and steering of these heavy and more often cumbersome vehicles have thus become a major and complex problem in efficiently facilitating a particular operation where poor ground conditions are present.

Prior efforts to produce satisfactory means for maneuvering such vehicles have resulted in various systems to either facilitate or aid steering in combination with live axles (differential gear drives) or with dead axles (direct gear drives). With respect to those vehicles having a dead axle or direct gear drive, steering is commonly effected by wheel braking and/or clutching devices. To this end, a separate pedal or lever is provided for the control of each brake and each clutch, totaling as much as four levers which must be operated to accomplish the steering. To effect a shallow turn, one of the levers is operated to disengage the clutch controlling one track or one ground-engaging wheel. This causes the other track to move ahead at an increased relative speed to turn the vehicle slowly to one side. In effecting a sharp turn, a second lever is usually actuated to apply the brake controlling the same side of the vehicle. This completely stops or greatly retards one track or ground-engaging wheel to turn the vehicle sharply thereabout.

Thus, with the above type of system, two prime disadvantages are immediately apparent. First, to achieve a desired movement, a number of controls must be manipulated. This added to the number of control complexities already confronting the driver in proceeding with a particular work operation, reduces the general overall operating efficiency of the vehicle. Secondly, the braking of one of the ground-engaging wheels to facilitate a turn, tends to drag the locked wheel, thereby provoking tire scuffing and to set up excessive torsional stresses in the axle assembly. Moreover, the brake mechanisms may be easily overloaded to produce an overheating and short life of its component parts.

Unlike the basic dead axle drive, the great majority of vehicles today are found to be equipped with a differential gear drive, generally of the bevel gear type, for facilitating transmission of power to two wheels. When rounding corners or passing over uneven roads one wheel is allowed to revolve faster overcoming the problem inherent with dead axle units.

The conventional automotive differential employed divides the torque delivered to it by the engine equally between two outputs operatively connected to two wheels. This feature, however, has been recognized to present a serious disadvantage when traction at both wheels are not equal. Thus on terrains where the ground is soft or under other adverse conditions such as that caused by ice, the differential equipped vehicle is easily stalled or bogged down. As an example of an extreme case where one wheel rests on ice and the other rests on dry pavement, a relatively low torque will cause the wheel on the ice to spin. This same low torque will be all that is available at the wheel on dry pavement. Notwithstanding this serious shortcoming, the differential continues to predominate the automotive industry in view of the other highly desirable qualities.

The prior efforts to overcome this condition have been emphasized by various mechanisms, the more prominent of which are friction loading devices. Such systems are devised to artificially apply more friction to the wheel having the least traction by braking it so as to control the division of torque supplied by the differential. As previously discussed, however, the braking or friction loading of one wheel on the axle shaft connected to it imparts serious shortcomings resulting in excessive tire and brake wear and provokes the development of highly undesirable torsional stresses in the axle assembly.

It has been found that the disadvantage of braking the wheel may be avoided by operatively releasing the wheel as the differentiating is retarded. Thus, in accordance with the invention, this is accomplished by providing a unique brake and clutch mechanism compactly arranged on the axle shafts extending from each output of the differential gear drive to control the division of torque supplied by the gear drive and simultaneously to release one of two ground-engaging wheels for free rotation. In this manner, the differential equipped vehicle having the advantages stemming therefrom, whether it be of the front axle drive type or the standard rear axle drive type, may be driven over terrains and adverse road conditions not heretofore passable without tendency of stalling or bogging down. To further reduce the effort applied in maneuvering a vehicle so equipped, the steering of a vehicle equipped with a front axle drive is accomplished by rotating the entire axle assembly about a central vertical axis which is flexibly supported to accommodate movement over unlevel ground.

Accordingly, with the foregoing considerations and purposes in mind, it is the major object of this invention to improve the maneuverability of a vehicle.

It is further the object of this invention to provide a novel vehicle drive system embodying a differential gear drive and a brake and clutch device for controlling the division of differential torque output when one wheel of a two-wheel drive loses traction relative to the other wheel and simultaneously unclutching the wheel having lesser traction from the differential gear drive.

It is further the object of this invention to provide a novel vehicle drive system having a selectively driven brake and clutch device to simultaneously control division of torque output of a drive differential and to operatively release one of two associated ground-engaging wheels driven by the differential for free rotation.

It further is the object of this invention to provide a novel brake and clutch device having a hydraulic drive that is simply and easily controlled.

It further is the object of this invention to provide a novel coaxial clutch and brake mechanism in a steering drive axle assembly having a common vertical axis of rotation.

It further is the object of this invention to provide for a novel drive system of relatively simplified construction, compactly organized and comparatively inexpensive to manufacture.

These and other objects will become apparent by reference to the appended claims and as the description proceeds in connection with the accompanying drawings, wherein:

Figure 1 is a top plan view of the drive axle assembly according to a preferred embodiment of the invention;

Figure 2 is a front elevation of the drive axle assembly of Figure 1;

Figure 3 is a section substantially along line 3—3 of Figure 1;

Figure 4 is a section substantially along line 4—4 of Figure 3;

Figure 5 is a section substantially along line 5—5 of Figure 2;

Figure 6 is an elevation partly in section of hydraulic control valve mechanism;

Figure 7 is a section substantially along line 7—7 of Figure 6; and

Figure 8 is a section substantially along line 8—8 of Figure 6.

Referring now in detail to Figures 1, 2 and 3 and adverting first to the general assemblage, the numerals 10 and 11 respectively generally designate the drive axle assembly and the flexible support assembly. The ground-engaging wheels 12 and 13 each are driven by the drive axle assembly 10 through articulated driven axle shafts 14 and differentiating output axle shafts 16 extending from opposite sides of and driven through a differential gear drive 18 of usual construction. Power is transmittted to the gear drive 18 from a ring gear 20 receiving power from a pinion 22 mounted at the end of a suitably journalled vertical propeller shaft 24 to which the driving torque is transmitted from a horizontal engine shaft 26 through the bevel gear set 28. Mounted on each output axle shaft is a brake and clutch assembly 30 functioning to control the division of torque supplied by the differential and to operatively release the driven axle shaft 14 from the output axle shaft 16 as will be later described. Serving to support the axle assembly 10 in accordance with the present invention is the flexible axle assembly 11 as will be described.

In the drive axle assembly, the differential casing 34 is provided with a collar 36 having lateral extensions 38 and 40. This casing with its collar and lateral extensions is joined at 39 by suitable means to housing 41 in which propeller shaft 24 is mounted. Housing 41 in turn is suitably journalled in a stationary housing 43. Thus, the casing 34 with its collar 36 and housing 41 form the freely rotatable portion of a fifth wheel construction which revolves about the common vertical axis of the bearings 44 and 45 mounted in stationary housing 43, the latter being suitably fixed to the chassis 46 of the vehicle. A knob 48 is suitably secured adjacent to the outer end of each extension 38 and 40 by stud 50 or other suitable means, the same forming a ball joint by means of which the rotatable portion of the fifth wheel construction is connected to the steering mechanism (not shown).

Since the left and right hand portions of the axle assembly as viewed from Figure 1 are the same, a detailed description of one side will suffice. Thus, the articulated axle shaft 14 is provided with universal joint 52 at one end, a universal fitting 54 at the other end, and a splined section 56 intermediate of the ends so that the shaft is flexible both in a lateral and in a longitudinal direction. The end section 58 of the axle shaft constitutes a stub shaft upon which the wheel is mounted. This stub shaft 58 is journalled in a bearing block 60 which is positioned adjacent to but independent of the wheel 13. The differentiating output shaft 16 which is driven by the differential 18 is journalled adjacent its inner end in roller bearing assembly 62 which is pressed within socket 64 formed by casing 34. The casing is also formed with internal annular groove 66 providing a chamber for suitable packing 68 to seal the casing fluid tight with the periphery of the shaft 16.

A cylindrical axle housing 70 having open ends and a transverse annular partition member 72 provided with a hub 73 is suitably carried at one end on an annular shoulder formed by the differential casing 34 and is mounted concentric with the output axle shaft 16. The output shaft is further formed with an intermediate splined portion 74 within housing 70. An internally splined piston 76 is concentrically mounted for limited longitudinal sliding movement along the splined portion 74 of shaft 16. The piston comprises an annular flange member 78 and a sleeve portion 80 having a threaded end of reduced diameter. The annular flange member is formed with an outwardly facing braking disk face and a laterally extending skirt 82 integral with its outer periphery and having annular grooves 84 to define the piston lands 86 which slidably seal the piston fluid tight with the housing 70.

Both the sleeve portion 80 of piston 76 and the splined portion 74 of shaft 16 which are concentrically mounted within the housing are arranged to extend through a central opening in hub 73 of partition 72. This hub is provided with internal annular grooves to form the lands 88 which seal fluid tight with the sleeve portion 80. Thus, the housing 70 along with partition 72 and piston 76 form a hydraulic motor and a fluid tight chamber to receive fluid under pressure as it is introduced through port 90 in the housing for moving the piston axially along the drive shaft towards the differential casing.

A splined outwardly facing boss 91 is formed by the casing 34 concentric with the shaft 16. Mounted for longitudinal sliding movement along the splined boss 91 is an internally splined annular braking disk 92 coaxial with the piston 76 and opposing the braking face thereof. A retaining cap 93 is secured to the end of the boss by recessed screws 94 or other suitable means to act as a stop abutment for the disk 92. Urging the disk 92 towards the cap and thus towards engagement with the braking face on the piston 76 are radially disposed springs 95. These springs are received in bores 96 closed at one end and formed in the casing 34.

At the opposing end of the piston, a dog clutch collar 98 is concentrically pressed on the reduced diameter end of sleeve portion 80 and abuts on the annular shoulder 100. A jam nut 101 or the like threadedly mounted on the end of the sleeve secures the clutch against axial or rotatable movement relative to the piston. Radially disposed helical springs 102 bottomed in bores 104 formed in the hub 73 urge the clutch collar and piston outwardly toward the ground-engaging wheel.

The outer end of drive shaft 16 is threaded and is provided with a shoulder formed by reduced diameter portion 106. Concentrically and rotatably mounted on the shaft portion 106 and abutting the shoulder is the cooperating dog clutch drum 108 secured against axial movement relative to the shaft 16 by jam nut 112 or the like which is threaded on the end of the shaft to press the clutch drum against the shoulder formed by shaft portion 106. The clutch drum is journalled in the axle housing 70 by the ball bearing assembly 114 which is pressed into socket 116 formed at the end of the housing. This clutch drum is provided with universal joint 117 for operative connection to the driven axle shaft 14.

The outer periphery of the clutch drum 108 is splined for driving engagement by spaced sets of internal splines on the dog clutch collar 98. These mating surfaces are of usual construction and coact as cone friction clutches, being adapted to be engaged by the longitudinal movement of the clutch collar and thus providing a means for synchronizing the movement of the collar with the drum prior to establishment of a positive drive connection to avoid a clashing of the teeth. Thus, when the clutch collar 98 which rotates with the piston 76 and the output shaft 16 engages the clutch drum 108, the driven axle and hence the wheels are rotated to propel the vehicle in a predetermined direction.

The hydraulic system as shown diagrammatically in

Figure 1 for operating the pistons 76 comprises a compound brake cylinder and reservoir 118 of usual construction and a two-way valve 120 which is mounted adjacent the vehicle steering column (not shown) to provide for passage of fluid to and from either of the hydraulic motors as will be described. A foot pedal 122 or other suitable means is connected to the plunger 124 of the brake cylinder 118 in the usual manner to discharge fluid under pressure into the system.

Now referring to Figures 6, 7 and 8, the valve 120 comprises a cylindrical metal body 126 formed with an axial stepped bore 128 extending therethrough, the larger diameter bore 130 being tapered to form the seating surface which cooperates with the tapered valve plug 132 rotatably received in the bore. The valve plug is provided with a shank portion 134 which extends upwardly through a central opening in retainer plate 136 which is secured to the top of the valve body by machine screws 138 or other suitable means. A handle 139 is fixed to the shank portion 134 for rotating the valve plug. At the opposite end of the valve plug is a second shank portion 140 which extends through the valve body, and is rotatably and axially received in the smaller diameter bore 141 of stepped bore 128. The exposed end of the shank portion 140 is threaded to receive a jam nut 142. A spring 143 concentric with the exposed part of shank portion 140 biases a retaining washer 144 into abutment with the nut 142 to resiliently urge the valve plug into its seat.

The valve plug is formed with an axial bore 145 closed at one end and internally threaded at the outer end to receive the shank portion 140. The bore is intersected by the horizontally radially extending passage 146 near its upper end and by groove passage 148 near its lower end. The groove passage 148 extends through an angular distance of 90° and communicates with the horizontally radially extending inlet port 150 in the valve body. A first horizontally radially extending outlet port 152 is provided in the upper part of the valve body angularly spaced substantially 90° from the inlet port 150 to communicate with the passageway 146 when the valve plug is moved to one limiting position. A second horizontally radially extending outlet port 154 is angularly spaced substantially 180° from the inlet port and is in the same horizontal plane as the first outlet port. The passageway 146 communicates with the second outlet port when the valve plug is rotated to its second limiting position. Thus, when the valve is in one limiting position, the inlet port 150 will communicate with the first outlet port 152 through the groove passageway 148, the bore 144 and the upper radial passageway 146. When the valve plug is rotated substantially 90°, the groove passage 148 remains in communication with inlet port 150 throughout but passageway 148 now aligns with the second outlet port 154 to provide an unobstructed passage from the inlet to that outlet. A further turning of the valve plug will obstruct the inlet port preventing the passage of fluid. Thus, fluid by the selective positioning of the valve may be introduced to the hydraulic motor on either side of the differential.

Leading from each outlet port are flexible conduits 156 which connect to their respective ports 90 in the housing 70 on each side of the differential casing 34 for introducing or withdrawing hydraulic fluid to or from the associated hydraulic motor. A conduit 158 is connected at one end to inlet port 150 and at its other end to the brake cylinder 118 for transmitting fluid therebetween.

Under normal driving conditions fluid is not introduced to hydraulic motors. In the absence of an opposing fluid force, the springs 102 will urge both dog clutches to operatively connect each pair of output shafts 16 with the driven shafts 14 for transmission of power from the differential to the wheels on both sides as shown to the right in Figure 3. Now, when it is desired to aid the maneuverability of the vehicle or to increase the torque to one of the driven wheels, the valve 120 is set to one of its limiting positions and the foot pedal 122 is depressed. Fluid under pressure is then introduced to the selected hydraulic motor through the valve 120 and port 90. The piston 76 is moved axially inwardly until its braking face engages the braking disk. Upon this initial engagement, the piston carrying the dog clutch collar has not moved sufficiently to disengage the clutch and power is consequently still transmitted to both wheels. However, as the piston is splined to the drive shaft, the braking of the rotary motion of the piston as it engages the braking disk will be transmitted to the output shaft and thence to the differential to control the torque divided between the output shafts. Thus, the torque to the output shaft on the opposite side of the differential is increased by the partial locking of the one differential output. For straight steering, where the traction at each wheel is not equal due to road conditions, this braking of the differential will increase the torque to the wheel having the greater traction and the vehicle is thereby able to move forward from a stalled position. This also moderately assists in turning the vehicle in a desired direction.

Upon additional application of pressure to the brake cylinder pedal, more fluid will be introduced to the hydraulic motor, causing the piston which now is engaging the brake disk to axially move a further distance compressing the springs 95 and 102 and thereby causing the braking disk to move axially till it abuts the differential casing in limiting position as shown to the left in Figure 3. At the same time, the dog clutch drum and collar become completely disengaged and the associated wheel is thereby allowed to rotate free of the differential and differentiating output shaft. As the assembly on the opposite side of the differential is not subjected to the opposing hydraulic fluid force, the springs 102 will continue to hold the dog clutch collar engaged with the dog clutch drum. In this manner, one wheel now rotates freely while the opposite wheel receives twice as much torque as it normally would. The steering therefore may be effectively aided in turning in either direction and further in utilizing the increased torque applied to one wheel in propelling the vehicle over soft ground or the like.

Now referring to Figures 1 and 2, the bearing blocks 60 form the anchored end members of the flexible axle assembly 11 constituted by the main leaf springs 160 and the pairs of auxiliary leaf springs 162 and 164. The casing 34 is provided forwardly and rearwardly with studs 166 and 168 upon which are freely mounted the spring hangers 170 and 172. Suitable means such as U-bolts 174 bolted to the spring hangers clamp the main springs in position as best shown in Figure 4. Thus, by virtue of this mounting, the main leaf springs are free to swing transversely of the vehicle about the pivotal axis afforded by studs 166 and 168. The frame of the vehicle is thereby maintained level when one of the wheels rests on a different elevation than the other and the weight borne by each wheel remains equally divided. As such, the main leaf springs 162 and 164 provide a support for the differential casing 34.

The lateral extensions 38 and 40 of collar 36 form spring perches to which the inner ends of the pairs of auxiliary springs 162 and 164 are pivotally received as by the bolts 176 as shown in Figure 5. These auxiliary springs normally remain unflexed. Under adverse conditions such as heavy loading of the drive axle assembly or when one wheel is elevated both or either extensions 38 and 40 serve as abutments which the auxiliary springs engage, causing a flexure thereof to assist the main springs in sustaining the weight of the vehicle. Under ordinary conditions, these auxiliary springs do not engage the abutments and merely act as tie rods to maintain the wheels in their proper vertical planes. This combination of two spaced main springs and a pair of auxiliary springs on either side of casing 34 provides for a four point suspension rendering the bearing blocks 60 extremely flexible in accommodating the transmission of strains engendered by road vibrations.

Referring to Figure 2, the flexure of auxiliary springs 164, resulting when wheel 13 is on a higher elevation than wheel 12, causes a shortening of the spring which draws in the top of wheel 13 and moves the bottom thereof laterally outwardly. At the same time, the opposite wheel 12 is held from lateral inclination by the springs 162 acting as tie rods, thereby causing a slight increases in the distance between the wheels. This increment of increase is allowed for by the splined section 56 permitting an elongation of the shaft and by the flattening of the main springs 160. Since, in the preferred form of the invention the axle shafts are of unequal lengths to compensate for driving torque, the main springs on one side of the pivotal connection with the differential casing are longer than on the other side thereof, and the auxiliary springs 164 are of correspondingly greater length than the auxiliary springs 162. While the invention provides for a flexible axle support assembly in the preferred form to aid in the maneuverability of the vehicle, it is understood that the brake and clutch mechanism may be incorporated with differential units having other types of axle assemblies.

Since the drive axle and flexible support assemblies 10 and 11 are mounted on the rotatable casing 34, the entire assemblage including the wheels will rotate about a central vertical axis as the casing 34, through operative connection with the steering wheel (not shown) is revolved to turn the vehicle in either direction.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a drive axle assembly having axle housing means, differential gear drive means carried by said housing means, at least two differentially driven output shafts extending from said gear driven means, traction means on opposite sides of said gear drive means comprising a driven axle shaft and a ground engaging wheel mounted on said driven axle shaft for rotation therewith, means operatively connecting said output shafts with respective ones of said traction means, said connecting means comprises motor driven means mounted on each of said output shafts free for axial movement with respect thereto and having an associated braking face and an associated clutching face opposite said braking face, at least two brake members non-rotatably mounted in said housing means on each side of said gear drive means for operative engagement with respective ones of said associated braking faces, a clutch member drive connected to each of said driven axles for operative engagement with respective ones of said associated clutching faces and motor drive means for axially moving said motor driven means in a predetermined direction; and means for controlling the torque divided between said shafts and simultaneously disengaging a selected one of said traction means from its associated one of said shafts to provide for free rotation thereof.

2. The device defined in claim 1 wherein said motor driven means and said brake members are concentric with respective ones of said output shafts.

3. In a steering drive axle assembly having a rotatable axle housing, differential gear drive means carried by said housing with at least two differentially driven output shafts extending outwardly therefrom, and traction means operatively connected to said output shafts on opposite sides of said housing; and means for simultaneously frictionally loading the differential action of said gear drive means and for disengaging a selected one of said traction means from said output shaft comprising motor driven means having an associated braking face and an associated clutching face concentrically mounted on each of said output shafts for axial movement with respect thereto; a brake member non-rotatably mounted in said housing on each side of said differential gear drive means for operative engagement with respective ones of said associated braking face; a clutch member drive connected to each of said traction means for operative engagement with respective ones of said associated clutching faces; and motor drive means for operating said motor driven means to respectively engage and disengage said braking and clutching faces with their associated brake and clutch members.

4. In the device as defined in claim 1 wherein said motor driven means, said associated brake member and said associated clutch member are all coaxially mounted.

5. In a drive axle assembly having a housing, differential gear drive means carried in said housing and having two coaxial outputs; a pair of differentially driven output shafts, one on each side of said gear drive means in said housing and operatively connected to respective ones of said differential outputs, motor driven means splined to each of said output shafts for axial movement relative thereto and having a braking face and a clutching face for operatively connecting said output shafts to respective ones of said traction means; a pair of brake members non-rotatably mounted in said housing one on each side of said gear drive means and axially biased towards respective ones of said braking faces; a cooperating clutch member drive connected to each of said traction means for operative engagement with respective ones of said clutching faces, and motor drive means for axially moving said motor driven means toward respective ones of said brake members for frictionally engaging said brake members with respective ones of said braking faces to control output torque division between said shafts and simultaneously to disengage said clutching faces from respective ones of said clutch member.

6. In the device defined in claim 5 wherein said housing is rotatable about its vertical axis.

7. In the device defined in claim 5 wherein respective ones of said motor driven means comprises a piston member defining one end of a chamber formed by said housing and means urging said piston member to releasably engage said clutch member and to disengage from said brake member.

8. In the device defined in claim 7 wherein said motor drive means comprises hydraulic means for introducing hydraulic fluid into said chamber to move said piston member.

9. In the device defined in claim 6 wherein said brake member, said motor driven means and said clutch member are coaxial.

10. In a drive axle assembly having a rotatable casing, a differential gear drive mounted in said casing; at least two differentially driven output shafts extending from said gear drive and operatively connected thereto, at least two driven shafts one on each side of said casing and a ground-engaging wheel mounted on each of said driven shafts, means operatively connecting said output shaft with respective ones of said driven shafts, and means for simultaneously controlling the output torque division between said ouput shafts and disengaging said driven shafts from respective ones of said output shafts comprising cylindrical housing portions one on each side of said casing concentric with respective ones of said output shafts, piston members concentrically splined on respective ones of said output shafts free for limited axial movement relative thereto and engaging respective ones of said housing portion about its periphery to form a fluid chamber with said housing portion, each of said piston members having a braking face at one end and a dog clutch collar extending beyond said chamber near its opposite end; brake members non-rotatably mounted on said casing one on each side of said gear drive and concentric with respective ones of said output shafts for operative engagement with respective ones of said braking faces, cooperating dog clutch drums drive connected to respective ones of said driven shafts for operative engagement with respective ones of said dog clutch collars, a valve member communicating with said chamber operable to admit or withdraw fluid from said chamber for moving said piston member in either axial direction and a hydraulic pump communicating with said valve member for delivering fluid thereto.

11. In the device defined in claim 10, wherein said brake members, said piston members and said cooperating dog clutch drums are all coaxial.

12. In a drive axle assembly having an axle housing, a differential gear drive disposed in said housing, and having at least two opposed outputs, at least two rotatable wheels one on each side of said housing opposite said outputs, shaft means operatively connecting said outputs with respective ones of said wheels and a brake and clutch between at least one of said outputs and one of said wheels for simultaneously braking said one output of the differential gear drive and unclutching said one wheel from said gear drive whereby said one wheel rotates freely and said other wheel receives all the torque delivered to said differential gear drive.

References Cited in the file of this patent
UNITED STATES PATENTS

| | | |
|---|---|---|
| 1,268,334 | Everett | June 4, 1918 |
| 1,405,159 | Polaski et al. | Jan. 31, 1922 |
| 1,440,341 | Crispen | Dec. 26, 1922 |

FOREIGN PATENTS

| | | |
|---|---|---|
| 907,690 | France | Mar. 19, 1946 |
| 871,564 | Germany | Mar. 23, 1953 |
| 899,149 | Germany | Dec. 7, 1953 |